July 1, 1930.  S. C. SMITH  1,769,653
RADIATOR REPAIR STAND
Filed Oct. 13, 1927
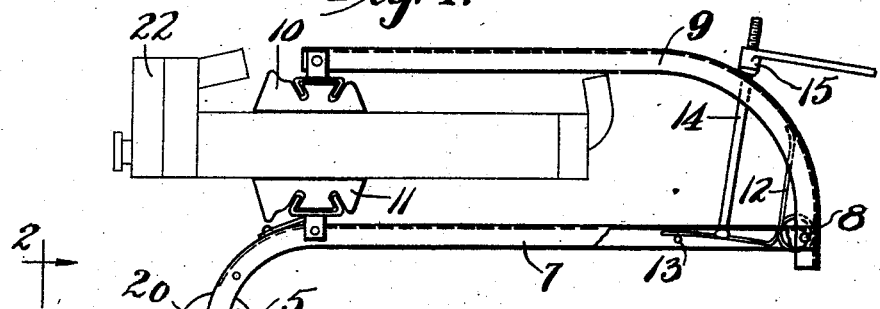
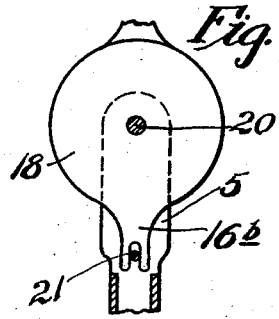
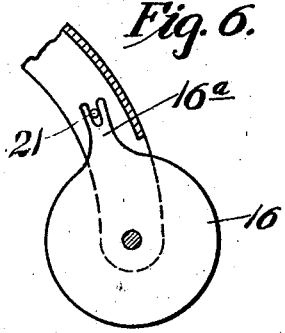
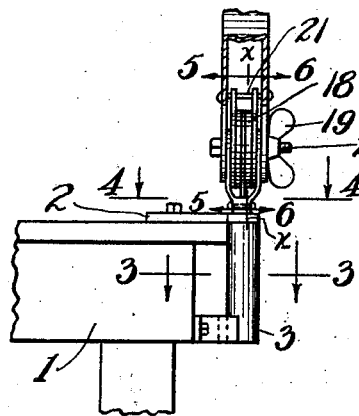
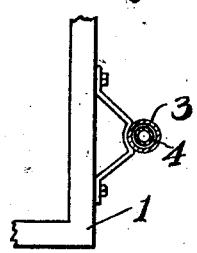
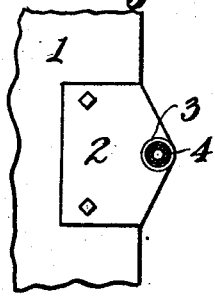
INVENTOR
Stewart C. Smith
BY Thomas E. Scofield
ATTORNEY Patented July 1, 1930

1,769,653

UNITED STATES PATENT OFFICE

STEWART C. SMITH, OF RAYTOWN, MISSOURI, ASSIGNOR OF ONE-HALF TO JAMES H. GREENE, OF RAYTOWN, MISSOURI

RADIATOR-REPAIR STAND

Application filed October 13, 1927. Serial No. 225,958.

This invention relates to improvements in radiator repair stand and refers more particularly to a stand for holding automobile radiators while the repair man is making repairs upon the radiator.

Among the salient objects of the invention are to provide a radiator repair stand by means of which the radiator may at all times during the repair job be readily accessible to the person making the repairs thereon; to provide a structure which is simple of construction, easy to adjust, inexpensive to manufacture, strong, durable and admirably adapted to the purpose for which it is designed.

Fig. 1 is a side elevational view of the stand.

Fig. 2 is a view taken from a position shown by line 2—2 in Fig. 1.

Fig. 3 is a view taken along the line 3—3 in Fig. 2, looking in the direction of the arrows.

Fig. 4 is a view taken along the line 4—4 in Fig. 2.

Fig. 5 is a view taken along the line X—X looking in the direction of the arrows marked 5—5.

Fig. 6 is a view taken along the line X—X looking in the direction of the arrows and marked 6—6.

Referring to the drawings, at 1 is shown a work bench to which is bolted or otherwise attached a bracket 2; this bracket has a socket 3 in which sets a post 4. The upper part of this post is bifurcated, as shown at 5. Mounted upon the post, and pivoted at 6, is a support or body 7, and pivoted at the end of the body support at a point designated as 8, is a clamp arm 9. At the end of the clamp arm is attached a clamp bock 10 and directly opposite from this clamp block 10 on the stand body or support is pivoted the clamp block 11. A spring 12 is anchored at 13 to the support 7, passes in behind the pin or pivot post 8 and rests against the curved portion of the clamp arm. The function of the spring is to keep a constant tension upon the clamp arm.

Working against the spring is a bolt 14 anchored to the support and passing through the clamp arm. The end of the bolt passing through the clamp arm is threaded, upon which threads are secured a lever nut 15. Between the bifurcated ends of the post 5 and the end of the stand or support 7 and at the pivot point where they are connected are friction discs 16 and 17, positioned between fabric friction material, designated as 18. This friction material may be brake lining, rubberoid or any suitable material lying between the friction discs to produce the effect of a friction joint and hold the body of the stand or the support in a fixed position when the butterfly nut 19 is tightened upon the bolt 20, the latter consisting of the pivot point for the stand or body upon the pivoted post 4.

On the circumference of the discs are bifurcated lugs $16^a$ and $16^b$ which engage the bolt 21 and prevent rotation of the discs.

The operation of the device is more or less obvious from its description. The support post 4 is inserted in the bracket and the body portion lowered to a horizontal position, as shown in Fig. 1. The clamp arm is then released by unscrewing the lever nut 15 and the radiator, designated as 22 in the drawings, placed between the clamp blocks. The lever nut is then screwed down so that the clamp blocks hold the radiator rigidly in position.

The thumb screw or butterfly nut 19 may then be released and the radiator swung vertically or horizontally into any position desired.

The movement of the radiator into any desired position greatly facilitates work upon the radiator and is especially useful where soldering is to be done at different points upon the radiator body.

In the drawings the clamped arm and support are shown as channels, but this construction may also be varied without departing from the spirit or scope of the invention.

The principal advantage and novelty lies particularly in the construction which consists of a pivoted stand having a readily adjustable clamp arm and blocks between the clamp arm and body for holding the radiator in position. Also the mechanism for swinging the radiator into any desired position and fixing it in the position while the operator or repair man is doing work upon the radiator.

The present embodiment of the invention has been disclosed in detail merely as an example, and it is appreciated that changes in the constructional details and in combination and arrangement of parts may be made without changing the functioning of the device or sacrificing any of the advantages of the invention.

It is thought that the construction, utility and quick adjustment are advantages which are apparent and of considerable value to repair men handling a heavy clumsy device such as an automobile radiator.

I claim as my invention:

1. A radiator repair stand including a lower pivoted member adapted to freely turn on a vertical axis, a hinged holding member pivoted to the pivoted member and adapted to be swung and fixed in any predetermined position in a vertical plane through which it may be rotated, the hinged portion of the holding member and the pivoted portion thereof having clamps adapted to engage a radiator, and releasable means for causing the clamps to rigidly grip the radiator when placed between the clamps.

2. A radiator repair stand including a hinged holding means, clamps adjacent each other on the two portions of the hinged holding means, said clamps adapted to engage a radiator when placed therebetween, and pressure creating means for holding the radiator rigidly in position between the clamps, a freely movable vertical pivot member, and an adjustable bearing between one end of the hinged holding means and the vertical pivot member adapted to permit the holding means to be set and fixedly held in any predetermined position in a vertical plane coinciding with the arms of the holding means.

STEWART C. SMITH.